(12) United States Patent
Lorts (10) Patent No.: US 9,494,089 B1
(45) Date of Patent: Nov. 15, 2016

(54) HYDRAULIC SERVO GAS REGULATOR FOR MULTI-FUEL ENGINE

(71) Applicant: Anthony Lorts, West Bloomfield, MI (US)

(72) Inventor: Anthony Lorts, West Bloomfield, MI (US)

( * ) Notice: Subject to any disclaimer, the term of this patent is extended or adjusted under 35 U.S.C. 154(b) by 128 days.

(21) Appl. No.: 14/593,653

(22) Filed: Jan. 9, 2015

Related U.S. Application Data (63) Continuation-in-part of application No. 13/374,810, filed on Jan. 14, 2012, now Pat. No. 8,935,078.

(51) Int. Cl.
| | | |
|---|---|---|
| *F02D 19/02* | (2006.01) | |
| *F02D 19/06* | (2006.01) | |
| *F02M 21/02* | (2006.01) | |
| *F02D 19/08* | (2006.01) | |
| *F02B 69/04* | (2006.01) | |
| *F02M 69/54* | (2006.01) | |

(52) U.S. Cl.
CPC ............. *F02D 19/022* (2013.01); *F02B 69/04* (2013.01); *F02D 19/0642* (2013.01); *F02D 19/0644* (2013.01); *F02D 19/0647* (2013.01); *F02D 19/08* (2013.01); *F02D 19/081* (2013.01); *F02M 21/02* (2013.01); *F02M 69/54* (2013.01)

(58) Field of Classification Search
CPC ............. F02D 19/022; F02D 19/0642; F02D 19/0644; F02D 19/0647; F02D 19/08; F02D 19/081; F02M 69/54; F02M 21/02; F02B 69/04

USPC ................ 123/575–578, 299, 300, 304, 456, 123/27 GE, 525, 457, 458, 461, 462, 463, 123/526, 1 A; 701/104, 103, 102, 112
See application file for complete search history.

(56) References Cited

U.S. PATENT DOCUMENTS

| | | |
|---|---|---|
| 5,367,999 A | 11/1994 | King et al. |
| 5,522,369 A | 6/1996 | Povinger |
| 5,771,857 A | 6/1998 | Willi |
| 6,298,833 B1 | 10/2001 | Douville et al. |
| 6,626,150 B2 | 9/2003 | Palma |
| 6,701,905 B1 | 3/2004 | Gaskins |
| 7,140,354 B1 | 11/2006 | Hashemi |
| 7,178,335 B2 | 2/2007 | Bickley |
| 7,308,889 B2 | 12/2007 | Post et al. |
| 7,463,967 B2 | 12/2008 | Ancimer et al. |
| 7,624,720 B1 | 12/2009 | Dokas et al. |
| 7,661,409 B2 | 2/2010 | Schule |
| 7,922,833 B2 | 4/2011 | McMahon et al. |
| 8,096,522 B2 | 1/2012 | Bachmaier et al. |
| 2006/0213488 A1 | 9/2006 | Post et al. |

FOREIGN PATENT DOCUMENTS

CA     1203132 A1    4/1986

*Primary Examiner* — Mahmoud Gimie
(74) *Attorney, Agent, or Firm* — Warn Partners, P.C.

(57) ABSTRACT

A bi-fuel and dual-fuel engine variable pressure fuel system is presented facilitating individual or simultaneous use of liquid and gaseous fuels including natural gas, hydrogen and gasoline, through employment of a variable output pressure gaseous fuel regulator incorporating an attached hydraulic amplifying structure communicating with a relatively low pressure fluid servo circuit that may in turn communicate with a variable pressure automotive liquid fuel system to facilitate relatively high pressure gaseous fuel injection.

20 Claims, 5 Drawing Sheets

HYDRAULIC SERVO GAS REGULATOR FOR MULTI-FUEL ENGINE

CROSS REFERENCE TO RELATED APPLICATIONS

The instant application is a continuation-in-part of U.S. patent application Ser. No. 13/374,810, filed Jan. 14, 2012. The disclosures of the application are incorporated herein by reference.

BACKGROUND OF THE INVENTION

A variable pressure gas rail injector pressure means is described by Willi in U.S. Pat. No. 5,771,857, as applied to direct injection, glow ignited natural gas engines. Here variable gas rail pressure is generated by an electronically modulated diesel injection pump that applies high pressure diesel fuel to the control side of a dome loaded regulator to produce correspondingly high, unamplified variable gas injection near TDC to optimize variable pressure direct injection.

Laing and Prichard in Canadian patent CA1203132 describe a duel fuel diesel engine, utilizing variably reduced hydraulic pressure in a servo circuit bled from the diesel injection pump and controlled by a centrifugal governor which variably pressurizes the control or load chamber of a gas regulator with diesel fuel in typical dome load fashion, to provide variable gas fuel pressure to a diesel engine air intake.

Bickley in U.S. Pat. No. 7,178,335 describes a spool valve hydraulic pressure regulator with variable output pressure controlled by a hydraulic load chamber augmented by an internal load spring whose compressive force is varied by an abutting moveable piston adjustable by means of a separate hydraulic actuating chamber contiguous with the end of the piston opposite the spring.

McMahon and O'Halloran in U.S. Pat. No. 7,922,833 describe an invention utilizing a hydraulic cylinder attached to a gas regulator that contains a piston displaceable against a point on a flexible regulator pressure sensing diaphragm for the purpose of varying the tension within the diaphragm in order to vary the pressure of the outflowing gas flowing into a deburring thermal energy machine (TEM.) Variable regulator outflow pressure is here determined by varying the tension of the flexible diaphragm, as opposed to the present invention, where variable hydraulic servo pressure acting through an amplifying piston-pushrod structure upon a regulator pressure sensing piston is the regulator load controlling element as opposed to variable tension within a regulator sensing diaphragm.

Multiple variable pressure regulator control means including pneumatic, hydraulic, mechanical, electric and electro-hydraulic are cited in the ECU controlled variable gas pressure system of King in U.S. Pat. No. 5,367,999. A detailed description is provided describing a variable pressure pneumatic regulator actuator embodiment in this specification, but only general reference is made to other variable hydraulic pressure regulator biasing means in the claims, with no details provided in the specification.

Douville, Noble, Baker, Tran and Touchette describe a dual fuel diesel direct injection system in U.S. Pat. No. 6,298,833 having one injector that injects both a gaseous main charge and a diesel fuel pilot ignition charge into the engine cylinder, and where a dome loaded regulator directly senses diesel pilot injector fuel pressure, and regulates the main gaseous fuel charge at an equal or slightly lower output pressure, to maintain a positive seal between the gas and liquid fuels within the injector.

Post and Brook in Pub. No. US2006/0213488 A1 describe a variable pressure direct gas injection system that includes a hydraulic dome loaded regulator that contains a spring biased flow control valve where the hydraulic load fluid acts against the bias spring to vary gas injector fuel pressure (in a manner similar to McMahon and O'Halloran.) The hydraulic load fluid may consist of diesel pilot fuel and here is always approximately equal to or higher than the regulator outflow gas pressure to avoid gas leakage into the diesel load control fluid.

Ancimer, Batenburg and Thompson in U.S. Pat. No. 7,463,967 present a variable pressure, direct supersonic gas injection control system utilizing a single injector for both the diesel pilot and the main gaseous fuels. This also includes a dome loaded regulator that maintains almost equal pressure within the gas and the liquid portions of the injector to insure an effective seal between the two fluids.

Palma in U.S. Pat. No. 6,626,150 and Dokas, Pyle and Yu in U.S. Pat. No. 7,624,720 describe electromagnetically controlled gasoline type regulators.

Hashemi in U.S. Pat. No. 7,140,354 reveals a means for depressurizing a gaseous fuel injector supply rail with a pump that pumps excess gas from the fuel rail back upstream into either the gas supply tank or to a point upstream of one of the pressure reducing regulators that feed the fuel rail. This pumping means is controlled by an ECU for the purpose of maintaining rail pressures compatible with the operating characteristics of gaseous fuel injectors.

The present invention is differentiated from prior art by its' ability to safely utilize low pressure, volatile spark ignitable fuels as a hydraulic regulator servo pressure fluid to produce an amplified, high pressure fuel supply from a gas regulator. The present servo amplifying means differs from conventional dome loaded regulators in that the pressurized servo fluid is mechanically isolated and amplified by the piston-pushrod structure, which moves to block orifices in the present hydraulic amp communicating with the vehicle fuel system in response to a high pressure leak from the gas regulator.

The presently described electronic cylinder cutoff and fuel pressure sensing throttle control means obviate the need for the pump dependent, high pressure fuel rail de-pressurizing means described in Hashemi.

The present invention is applicable to bi-fuel and dual-fuel internal combustion engines that utilize gaseous and liquid fuels either simultaneously or individually. It is aimed at dealing with the limited response characteristics of high pressure solenoid type gaseous fuel injectors when activated by present 12 volt petrol (gasoline) engine control units (ECU's,) where the injectors are synchronized to the speed, or RPM of the engine. To compensate for the larger volumes of gaseous fuel required to deliver the equivalent energy of gasoline, gaseous (gas) injectors operate under higher pressures, with larger, heavier moving valve components as compared to petrol type injectors. This can result in minimum open/close cycle periods twice as long as those of their petrol counterparts. At low speed idle power with a static, high fuel rail pressure necessary for maximum power, the gas injector can fail to fully open in response to short ECU commanded voltage pulse widths. Minimum open cycle periods for solenoid gas injectors are typically around 4 milliseconds. At idle with a static gas fuel rail pressure that can meet the engines full operating power range, the ECU may command an injector open pulse width far less than 4 milliseconds. The injector may thus fail to respond fast enough to these short open signals, resulting in inconsistent fuel delivery, roughness and excessive emissions.

Where fuel injectors are typically synchronized by the ECU to cycle with engine RPM, low engine speeds allow more time for the injector to more accurately meter fuel. By lowering fuel supply pressure at idle speeds the injector can remain open longer, allowing more accurate response to the ECU. However when fuel demand increases with speed and the available injector cycle time decreases, a variably higher pressure fuel rail supply then becomes necessary to avoid fuel starvation.

SUMMARY OF THE INVENTION

The operating limitations of solenoid actuated gas injector valves are overcome here by proportionately raising and lowering fuel injector rail pressure with engine speed and load. Longer "open" voltage pulse width commands at low speeds are made possible with lower fuel supply pressures, allowing the injector to deliver small gas quantities per cycle with greater accuracy, while high fuel rail supply pressures are available at maximum speed and load. Controlling fuel flow through statically open gaseous injectors is also made possible through a precisely controlled variable pressure injector rail supply responsive to engine speed and load.

Figure 3:
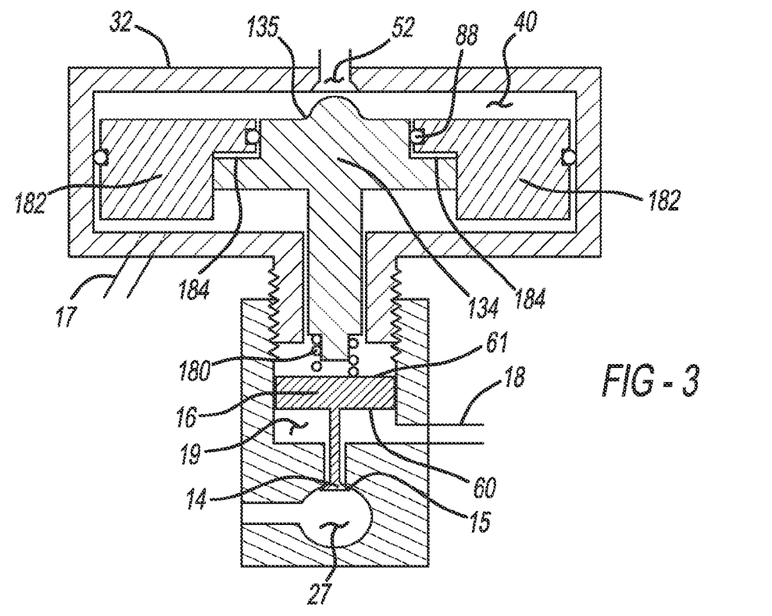
FIG. 3 is a detailed cross sectional representation of the alternate "two stage" iteration of the present invention, deactivated with zero servo pressure.
Figure 3A:
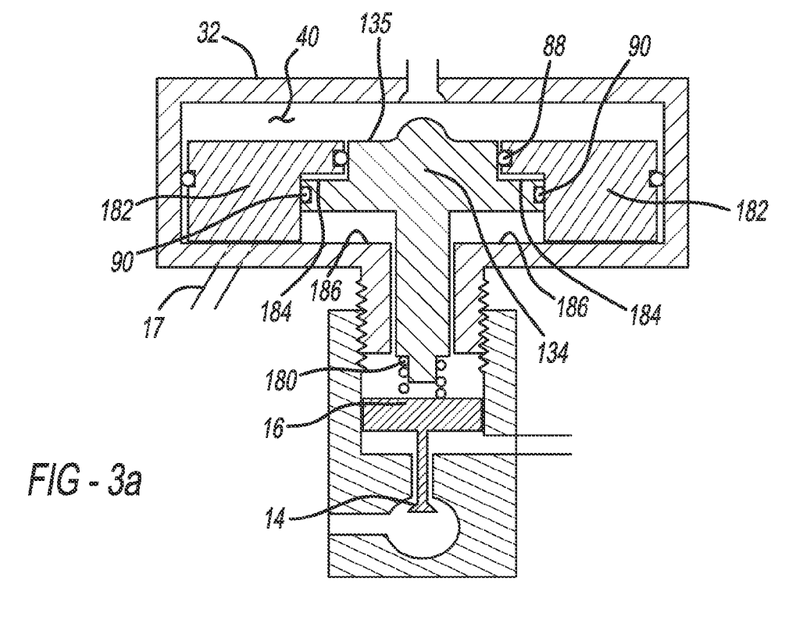
FIG. 3a is a detailed cross sectional representation of the "first stage" operational configuration of the alternate iteration of the present invention.
Figure 3B:
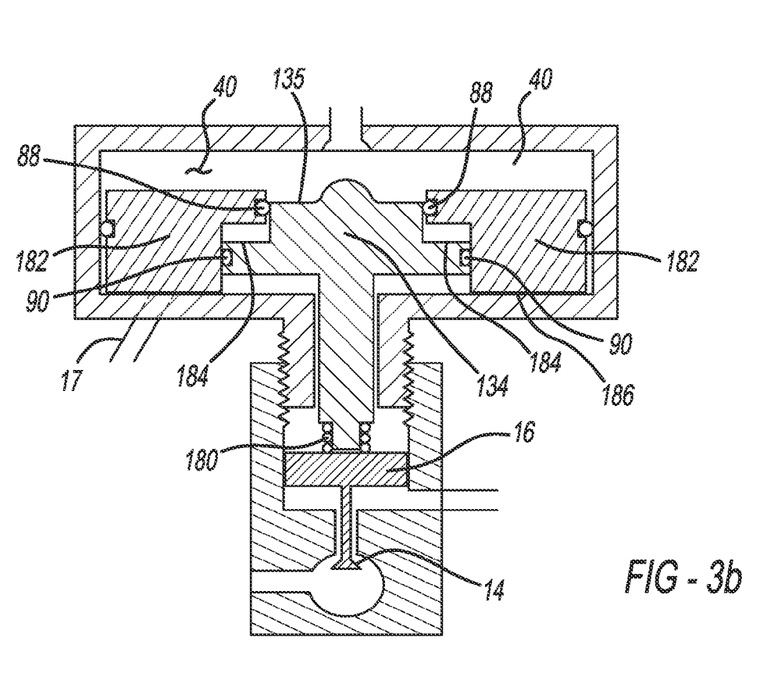
FIG. 3b is a detailed cross sectional representation of the "second stage" operational configuration of the alternate iteration of the present invention.

The present invention either eliminates entirely, or augments the typical output pressure controlling load spring that acts against the pressure sensing element within a gas regulator (usually consisting of a piston or flexible diaphragm attached to a flow control valve) by utilizing an attachable variable hydraulic pressure amplifying actuator henceforth referred to as a "hydraulic amp." The simplified regulator represented here is of the 20-1000 compressed natural gas (CNG) type presently made by Tescom, of Elk River, Minn., with a 50-89 psi load spring depicted in FIGS. 3-3b.

Figure 1:
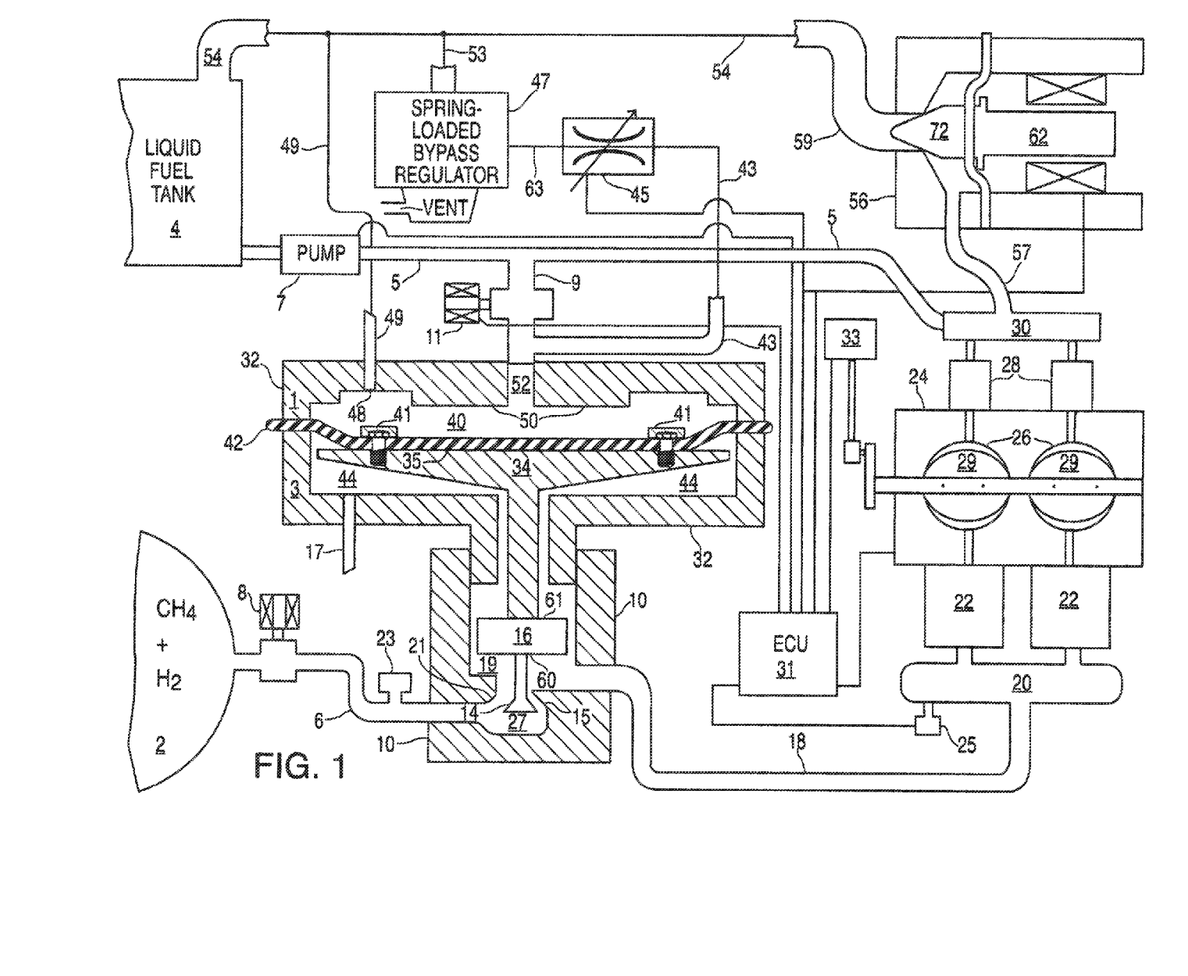
FIG. 1 is a detailed schematic of the present invention employed in a bi or dual-fuel throttle body injector fuel induction system.
Figure 2:
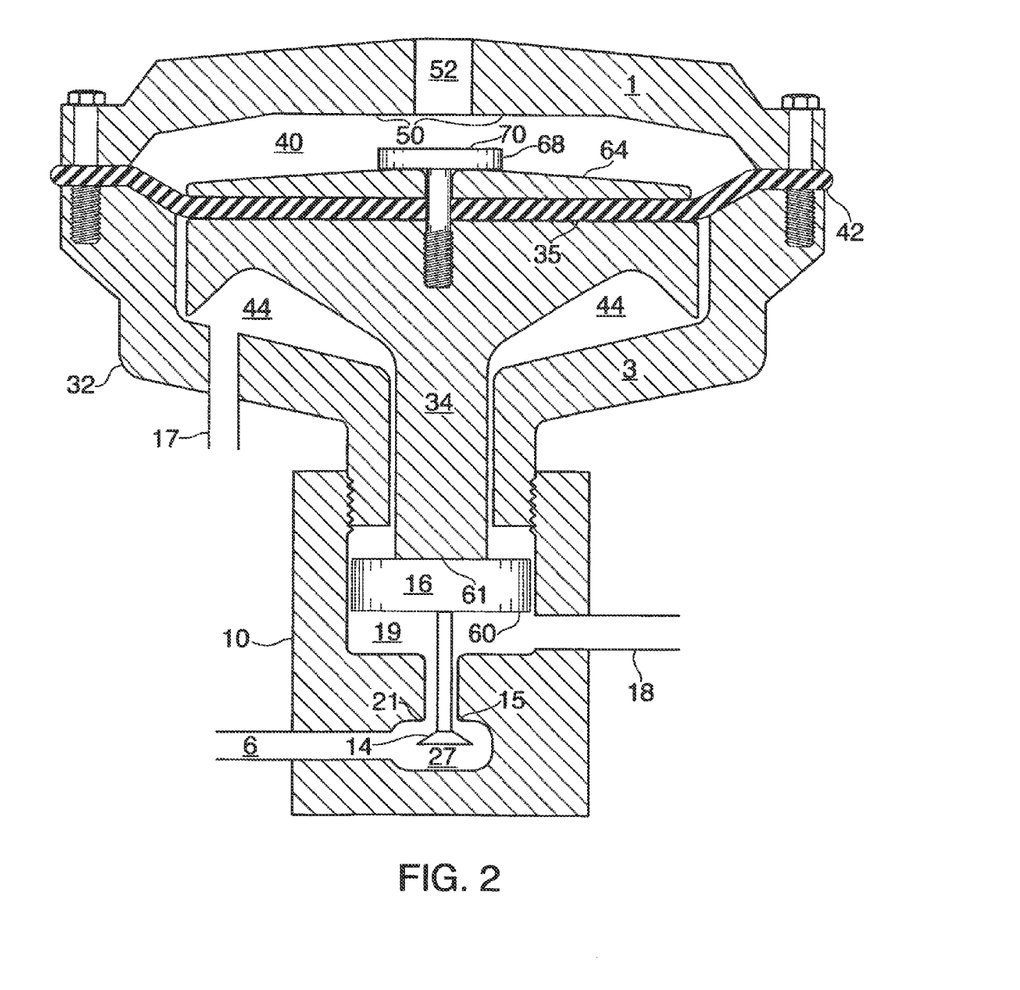
FIG. 2 is a detailed cross sectional representation of the hydraulic amp of the present invention.

Within the hydraulic amp of the present invention is a hydraulic pressure sensing piston and contiguous pushrod structure referred to henceforth as a "piston-pushrod." This spool-like structure has a relatively large pressure sensing piston crown surface at the "piston" end, and a smaller surface at the opposite "pushrod" end that either directly abuts the gas regulator's pressure sensing element on the seat normally acted upon by the load spring, or alternatively, may abut a load spring interspersed between the pushrod and the sensing element. This piston-pushrod structure reciprocates within the hydraulic amp in response to pressure exerted on its' piston crown by a variable pressure hydraulic servo circuit, which in the illustrated embodiment is comprised of a communicating gasoline or diesel liquid fuel supply system having an electric or engine driven fuel or "lift" pump. Other possible sources of servo pressure may be derived from vehicle fluid systems such as a windshield washer system, the engine cooling system and an air pump that supplies braking force or suspension adjustment pressure. One or more variably restrictive flow controlling devices within the servo pressure circuit may include a variable flow control valve and a fuel pressure regulator, to restrict flow and create variable backpressure sensed within the communicating hydraulic amp. An engine control unit (ECU) or separate computers may control servo fluid pressure by sending variable voltages to the fuel pump and variable flow servo control devices in response to engine fuel demand parameters related to speed and load such as manifold absolute pressure (MAP), RPM. Variable backpressure in the present embodiment caused by a fuel pump working against the servo flow control devices results here in a variable servo pressure of approximately 5 to 40 psig. Servo pressure within the hydraulic amp acting upon the piston-pushrod and transmits amplified control pressure directly to the gas regulator pressure sensing piston as shown in FIGS. 1 and 2. In an alternate embodiment shown in FIG. 3 through FIG. 3b, this amplified control pressure may act through the piston pushrod upon a typical load spring that in turn exerts a variable, elastic force upon the sensing piston. In typical fashion as depicted in the accompanying FIGS. 1 through 3, a flow control valve within the gas regulator attached to lower surface of the sensing piston variably reciprocates upon a closeable orifice positioned between the regulator's gas inflow and outflow conduits and meters outflowing gas pressure in response a control or "load" pressure acting on top side of the sensing piston, which in the present invention is ultimately determined by fluid servo pressure amplified and transmitted by the contacting piston-pushrod. Gas regulator outflow pressure here is multiplied over that of the servo fluid pressure by a factor determined by the difference in diameters between the relatively large hydraulic pressure sensing crown of the piston-pushrod within the hydraulic amp, and the smaller abutting gas pressure sensing piston within the regulator.

Alternate "Two Stage" Embodiment

To facilitate fluctuating servo fluid pressure from sources such as engine driven and electric coolant or fuel pumps that may produce insufficient steady low servo pressure at idle, an alternate embodiment is presented employing a conventional load spring positioned between the piston pushrod and the regulator pressure sensing element, activated by a moveable, surface area augmenting, servo pressure sensitive collar interfacing with crown of the piston pushrod. The collar may be in the shape of a thick flat washer that surrounds the circumference of the piston crown. The collar is fluidly sealed against the inner circumference of the amp housing and the circumference of the crown, and has restricted travel therewith. To move the load spring from an inert position to one producing low range control pressure against full motion of the regulator piston, this collar provides an augmenting force to assist the piston-pushrod in activating the load spring at the lower part of the engines fueling map. As depicted in the vertically disposed FIG. 3 cross sections, upon exposure to initial low servo pressure, the collar surface increases the effective servo pressure amplifying crown surface area of the piston pushrod providing additional force to induce limited downward motion of the piston pushrod through contact with a flange extending outward from the lower edge of the piston crown, in order to move the load spring into its low active range, initiating "stage one." During "stage one" of this embodiment, the piston-pushrod crown and the collar acting together apply an amplified servo pressure to hold a limited stationary downward position of the piston-pushrod in order to maintain the load springs' 50 lb. minimum control pressure against the regulator piston throughout its' full travel range. At this point, further motion of the collar and piston-pushrod is blocked by contact of the lower collar surface with the bottom inner wall of the hydraulic amp housing. Further downward movement of the piston-pushrod within the stationary collar ceases until rising servo pressure amplified solely by the smaller area of the piston crown exceeds the 50 lb. counterforce of the activated load spring. The load spring will thus maintain a steady 50 psi gas regulator output pressure until engine fuel demand increases above idle to where rising servo pressure is consistently stable. As servo pressure, amplified solely by the piston-pushrod crown (minus the added force of the now stationary collar) rises to a higher point exceeding the 50 lb. counterforce of the spring, (a pressure margin defined by the difference in surface areas between the piston crown and the collar,) "stage 2" activates, urging the piston-pushrod further downward within the stationary collar, applying increasing control pressure through the load spring to the sensing piston, thus raising regulator output pressure.

Throttle by Wire

Where specific air-fuel ratios are required over a wide range of output power, typical air inlet throttle mechanisms may be more responsive to rapid power change commands than variable output gas regulators, due to the compressibility of the high pressure fuel gas in the piping and fuel rail downstream of the regulator. Air inlet throttle control mechanisms may thus track and respond to transient power demand changes induced by variable pressure delivery gas regulators faster and more accurately than variable pressure delivery regulators can respond to air throttle induced power changes, and may thus produce finer control of air-fuel ratios. In one embodiment of the present invention especially applicable to engines operating within narrow air/fuel ratio limits, a "throttle by wire" system having an intake throttle valve operable in response to variable gas injector rail pressure may be employed to counter compressibility induced rail pressure lag during rapid fuel pressure induced power changes.

Precise air/fuel ratio control may therefore be obtained in the present embodiment through employment of a pneumatic or electrically actuated throttle mechanism that responds to operator commanded variable pressure within the gas injector rail. Power output in the present invention thus may be controlled by a "gas pedal" that actuates variable hydraulic flow and pressure controlling components within the present servo circuit (such as a variable flow hydraulic valve), that in turn control gas regulator output and injector rail pressure. Variable gas rail pressure can then operate a pneumatically actuated throttle valve, or be sensed by a throttle controlling ECU that proportionately actuates a motorized throttle valve.

Injector/Cylinder Deactivation

In multi injector configurations of the present invention, transient fuel rail pressure imbalances resulting from rapid power changes may be countered by employing an ECU injector or injector/cylinder cut off circuit. This circuit may contain a map that defines an injector operating envelope determined by RPM, fuel rail pressure and minimum pulse width. When fuel rail pressures exceed the injector's minimum pulse width, such as may occur when the operator rapidly lifts off of a fully depressed gas pedal with maximum fuel rail pressure, the ECU may deactivate one or more injectors (and cylinders,) causing the remaining injectors to operate at higher loads with longer pulse widths. When engine load and intake air flow increase, the idle injectors may then be progressively reactivated allowing continuously optimal injector operation and precise air/fuel ratio control.

There are numerous superior advantages, as will now be explained.

Pressure Droop

By eliminating the fixed load spring in a typical gas pressure regulator, the present hydraulic amp embodiment serves to eliminate output pressure drop or "droop" that occurs when control pressure exerted by the load spring on the sensing piston decays as the spring extends as the piston responds while moving the attached flow control valve open. Output pressure thus declines as gas flow demand increases with a typical gas regulator governed by a load control spring.

Supply Pressure Effect

The force required to open a closed, unbalanced gas regulator flow control valve must exceed the force exerted upon the valve head by the upstream supply tank supply pressure plus that of the force of the out flowing gas pressure upon the pressure sensing piston. When pressure on the inlet (tank) side of the valve falls with fuel consumption, the total force holding the valve closed decreases. Thus, the total force required to open the valve is reduced as the upstream supply tank pressure falls as fuel is consumed. For a conventional gas regulator with a fixed output controlling load spring, the output pressure to the fuel rail will then increase as supply tank pressure decreases. To maintain a constant regulator outflow pressure, the controlling pressure exerted on the load or control side of the regulator sensing piston must be reduced as supply tank pressure decreases. By replacing or augmenting the common regulator load spring with the present servo pressure actuated hydraulic amp, controlled by an ECU having input from an upstream pressure sensor such as a fuel tank quantity gauge, the present invention can maintain consistent outflow pressures independent of falling tank pressure, and eliminate droop associated with a fixed regulator load spring.

Expanded Range, Fewer Components, Safety

The wide range of controllable gas regulator output pressures (approximately 40 to over 95 psig in this iteration) made possible by the present servo controlled hydraulic amp expands the limited operating bandwidth of solenoid gas injectors. By lowering rail pressure at reduced engine speeds and loads, more accurate metering, lower injector noise and reduced power consumption is attained. Conversely, as RPM increases and the available injector open time per cycle decreases, the present invention increases injector rail pressure with increasing engine speed and fuel demand, increasing fuel flow through injectors that eventually may remain statically open at maximum engine speeds. Employed in a throttle body injection (TBI) configuration, the present variable gas rail pressure invention facilitates the utilization of fewer gas injectors, verses employing a plurality of injectors staged to operate over a wide load and speed range with a constant rail pressure.

By replacing or augmenting the regulator load spring in a gas regulator with the present fluid servo pressure controlled amp, when the engine and hydraulic servo pump stop, servo pressure bleeds down and residual gas rail pressure acts unopposed against the regulator's sensing piston to close the regulator flow control valve. Gas flow to the injectors is then blocked, reducing potential gas leakage through the injectors and the need for a downstream shut off valve typically placed in the conduit running between the regulator and the injector rail.

A safety advantage over common dome loaded regulators that have a load or servo control fluid applied directly to the regulator pressure sensing element occurs whereby the servo fluid and communicating vehicle fuel system of the present invention are protected from high pressure gas incursion from a damaged gas regulator sensing element by the present hydraulic amp.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

FIG. 1 shows a cross sectional representation of the present invention where gaseous and liquid fuels may be injected into the air inlet of an engine at throttle body 24. Gaseous fuel tank 2 may hold fuels such as natural gas and hydrogen at pressures currently averaging 3600 psig or higher. Liquid tank 4 may hold fuels such as gasoline, alcohol or diesel. Tank 4 supplies variable output fuel pump 7, which may be electrically or engine driven. Pump 7 supplies petrol injectors 28 within throttle body 24 through fuel line 5 and fuel rail 30. Throttle body 24 is represented here with two throttle bores 26 having typical shaft mounted throttle valves 29. Gaseous injectors 22 are mounted opposite liquid injectors 28 in throttle body 24. Either a gaseous or a liquid fuel can alternately be injected at throttle body 24 through either gas injectors 22 or liquid ("petrol") injectors 28 in a "bi-fuel" application of the embodiment. In a "dual-fuel" mode, gaseous and liquid fuels may be injected simultaneously by gas injectors 22 and liquid injectors 28, such as where alcohol or an alcohol solution may be selectively injected with methane or hydrogen in a supercharged application to avoid detonation or knock.

Petrol pressure in rail 30 may be controlled by a typical spring loaded bypass regulator communicating with fuel rail 30, or by the variable pressure electromagnetic bypass regulator shown here at 56, connected to rail 30 through pipe 57. Fuel bypassed through regulator 56 returns to tank 4 from output pipe 59 through contiguous fuel return line 54. Regulator 56 may be electronically controlled to maintain petrol pressure in rail 30 in a typical throttle body or port gasoline fuel injector pressure range of approximately 15 to 75 psig.

Fuel tank 2 supplies high pressure gaseous fuel, typically stored at pressures ranging from 200 to over 3600 psig, to piston type gas regulator 10, through pipe 6. Pipe 6 contains an electromagnetic shut off valve 8, and a temperature and pressure sensor 23. Gas regulator 10 variably reduces storage tank pressure to a range of approximately 40 to 95 psig in the present embodiment to feed gaseous injectors 22 through pipe 18 and rail 20. Variable output pressure from regulator 10 is produced by attached hydraulic amp assembly 32 that controls regulator pressure output in place of an output governing load spring. Amp 32 is variably pressurized by liquid fuel from pump 7 communicating with internal amp pressure sensing chamber 40 through fuel lines 5 and 9. Amp 32 may have orifice 48 located near the periphery of sensing chamber 40 to allow communication between it and weep line 49, and may then be rotated to locate orifice 48 uppermost so as to allow trapped air to rise and pass out of chamber 40 through weep line 49, and into return line 54 and tank 4. Tank 4 may then be vented in a typical fashion. Line 49 is of a sufficiently small diameter so as to allow variable servo pressure to be maintained in chamber 40, while still allowing a small venting flow of fluid into return line 54.

Referencing FIG. 1 and FIG. 2, hydraulic fluid pressure transmitted through lines 5 and 9 through orifice 52 to chamber 40 is sensed through diaphragm 42 (here composed of 1/32 inch thick fluorosilicone rubber.) Diaphragm 42 acts to seal pressurized servo fluid within chamber 40 and transmit variable servo pressure to the piston crown 35 of piston-pushrod 34. Pressure acting upon crown 35 exerts an amplified force through piston-pushrod 34 upon the load sensing surface 61 of regulator pressure sensing piston 16. An alternative sealing chamber may consist of an O-ring placed circumferentially between crown 35 of piston-pushrod 34 and the inner adjacent surface of hydraulic amp 32. Gaseous regulator sensing piston 16 is attached to flow control valve 14, which is variably closeable upon valve seat 15. Valve 14 reciprocates upon seat 15 to control the flow of gas from inlet pipe 6 through orifice 21, into gaseous pressure sensing chamber 19 and out pipe 18. Variable output pressure from regulator 10 is determined by the reciprocation of valve 14 upon seat 15 in response to the opposing forces acting on attached regulator sensing piston 16 by the outflowing gas pressure in chamber 19 acting on lower piston surface 60, and the servo pressure in amp chamber 40 acting through structure 34 upon upper piston surface 61. Upstream supply pressure within valve head chamber 27 may act variably against valve 14 when valve 14 is on or near seat 15, and can thus add a variable closing force to that of the pressure within chamber 19. The approximate amplification factor of gas regulator output pressure to liquid servo circuit pressure is determined by the ratio of the surface area of crown 35 of structure 34 to the smaller surface area 60 of regulator piston 16. Hydraulic servo circuit pressure in the present iteration ranges from approximately 12 to 35 psig, resulting in a gas rail pressure of about 40 to 95 psig.

Hydraulic Servo Circuit

Referencing FIG. 1, variable pressure within amp chamber 40 is determined by a hydraulic servo pressure control circuit comprised here of the following communicating fuel lines and variably restrictive components: Fuel pump 7 which feeds fuel line 5 and branching line 9; line 43 branching off of line 9 beneath solenoid valve 11 communicating with variable flow control valve 45; line 63 fluidly connecting valve 45 with bypass regulator 47; and line 53 fluidly connecting regulator 47 to fuel tank return line 54. Pressure within chamber 40 can be modulated through variable activation of pump 7 and valve 45, as well as by electromagnetic regulator 56 communicating with fuel lines 5 and 9 through pipe 57 and liquid fuel injector rail 30. Bypass regulator 47 is located downstream of valve 45 in order to facilitate stable pressure within the servo circuit at minimal fluid flow, and is set to maintain a minimum servo circuit pressure of 12 psig in this embodiment. Variable flow valve 45 may be comprised of a housing containing an orifice variably closeable by a threaded needle or spool valve reciprocating within a threaded bore, or of a rotating barrel valve, all of which may be actuated by an electronic stepper motor. Valve 45 if of a reciprocating spool or needle configuration, may alternately be actuated by a linear motor.

Figure 1A:
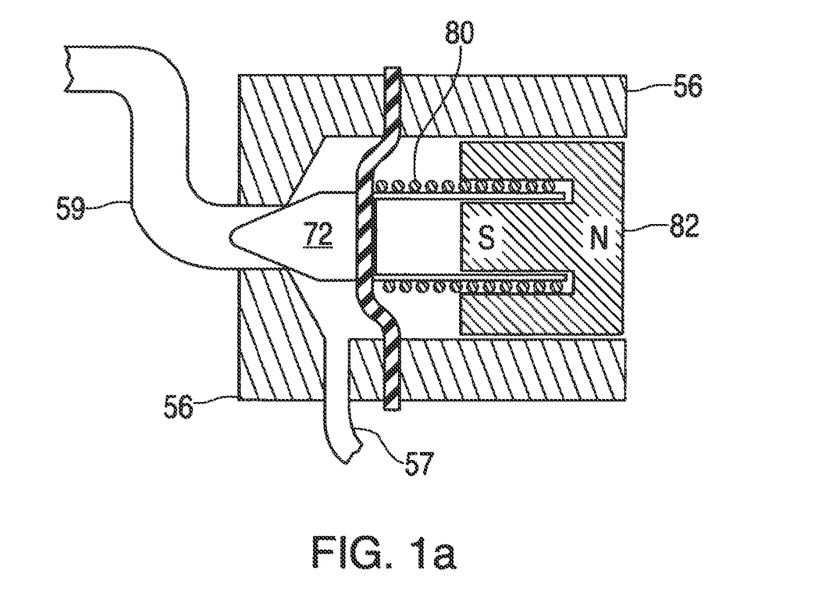
FIG. 1a is a voice coil actuated iteration of the electromagnetic liquid fuel pressure regulator 56 shown in FIG. 1.

Electromagnetic petrol regulator 56 communicating through pipe 57, rail 30 and fuel lines 5 and 9, may control hydraulic fuel pressure to both injectors 28, and selectively to upstream hydraulic amp chamber 40 through solenoid valve 11. Regulator at 56 variably reciprocates valve head 72 by an attached armature 62 actuated by a surrounding coil as depicted, or may alternately actuate valve 72 by an attached voice coil moveable within a magnetic field as seen in FIG. 1a. A single variable pressure regulator of sufficient dynamic range at 56 can thus obviate the requirement for separate parallel servo circuit components 45 and 47.

Restating the basic control principal of the invention, variable servo pressure within amp pressure chamber 40 may be regulated by varying the speed and output of pump 7 through electric or engine driven means, and/or by varying the flow capacity of variable valve 45, and/or by electrically modulating the movement of valve 72 within electromagnetic regulator 56. Backpressure generated by these components is sensed within amp pressure chamber 40 and amplified by virtue of the relatively large diameter of crown 35 of piston-pushrod structure 34, versus the smaller diameter of regulator sensing piston 16. Regulator piston 16, sensing the amplified force of pressure chamber 40 acting through structure 34, and the opposing force from regulator output chamber 19, variably reciprocates connected flow control valve 14 upon orifice seat 15 to deliver a servo controlled variable gas pressure supply to injector rail 20.

Bi-Fuel and Dual-Fuel Modes

Referencing FIG. 1, in petrol fuel only mode solenoid valve 11 within pipe 9 is closed, allowing hydraulic pressure within amp pressure chamber 40 to bleed down through weep line 49 and/or through the communicating, downstream parallel servo circuit components communicating with pipe 43. Depressurized chamber 40 then allows gas pressure within regulator pressure sensing chamber 19 to move regulator sensing piston 16 and connected flow control valve 14 upward against valve seat 15, closing off orifice 21 blocking gas flow from pipe 6 through pipe 18 to downstream gas injectors 22. Injectors 22 may be deactivated by ECU 31. Petrol injectors 28 then operate with fuel supplied by fuel pump 7 through fuel line 5 and rail 30, controlled by pressure regulator 56.

In a gaseous fuel only mode, petrol injectors 28 are deactivated by ECU 31 while solenoid valve 11 is energized, opening conduit 9 to allow variable hydraulic pressure to communicate with amp chamber 40 Pressure regulated gas from chamber 19 then flows through pipe 18 and rail 20 to gas injectors 22, activated by ECU 31. In a supercharged "dual-fuel" application, gas and liquid fuels may be injected simultaneously within throttle body 24, as where a heat absorbing fuel such as methanol may be variably utilized with a gaseous fuel to cool the inlet fuel-air mix in order to reduce detonation and add power. This may be accomplished by selectively activating liquid injectors 28 in response to boosted air charge pressures, while gas injectors 22 and solenoid valve 11 remain continuously operative to supply the main gaseous fuel charge. Diesel dual-fuel operation employing a diesel fuel pilot charge injected into the cylinders as an ignition source, with the main gaseous fuel injected into the inlet air at throttle body 24, can be accomplished by utilizing pump 7 as a lift pump to feed a high pressure diesel fuel injection pump and injectors (not shown) through fuel line 5, while simultaneously utilizing all of the variable hydraulic servo components of the present embodiment to deliver a variable pressure fuel supply to gas injectors 22.

Throttle by Wire

ECU 31 may receive fuel demand signals from sensors (not shown) that measure engine speed, and from sensors within throttle body 24 that measure manifold pressure, inlet air mass flow and temperature. Fuel tank quantity may be determined by ECU 31 from signals received from pressure/temperature sensor 23 within gas pipe 6. Sensor 23 output can also be used for feed-forward circuitry to compensate for increased regulator output pressure that can occur with declining tank pressure. Sensor 25 located on gas rail 20, supplies ECU 31 with pressure and temperature signals to control injector operating pulse widths, and to calculate variable supply voltages for pump 7, valve 45 and electric regulator 56 in order to maintain variable gas pressure in rail 20 for optimal injector performance.

ECU 31, receiving power demand input from an operator controlled "gas pedal" may control engine output by variably controlling gas injector rail pressure through modulation of hydraulic servo components pump 7, valve 45 and/or electromagnetic regulator 56. Variable servo pressure thereby produced variably actuates hydraulic amp 32 to produce in an amplified variable gas injector rail pressure from regulator 10. Pneumatic actuator 33 or a throttle motor powered by ECU 31 then regulates inlet air flow via throttle valves 29 in response to variable fuel pressure to produce an optimum air/fuel ratio.

Safety

Referencing FIG. 1 and FIG. 2, diaphragm 42 is clamped between the upper 1 and lower 3 halves of hydraulic amp 32, and primarily serves to seal hydraulic servo pressure within chamber 40. Annular space 44 surrounding piston-pushrod 34 is vented to a suitable place outside of the vehicle through communicating vent conduit 17. Vent 17 with appropriate connected piping, serves to direct fuel to a safe area should diaphragm 42 or pressure sensing piston 16 within gas regulator 10 leak. In FIG. 1, diaphragm 42 is held against the periphery of piston crown 35 of piston-pushrod 34 by attached retaining ring 41, represented here in cross section. Should high pressure gas from regulator 10 leak past regulator piston 16 and structure 34 into annular space 44, excess pressure in space 44 will force structure 34 upward with diaphragm 42 and ring 41 to block orifices 52 and 48, preventing the ingress of gas into chamber 40 and the communicating vehicle fuel system. This possibility is reduced by the venting function of conduit 17.

Referencing FIG. 2, the function of retaining ring 41 may be supplanted by plate 64 which secures diaphragm 42 to crown 35 of piston-pushrod 34 with bolt 68. Air pockets within chamber 40 can rise and exit through orifice 52, eliminating the need for orifice 48 and weep line 49 shown in FIG. 1. A high pressure leak from regulator 10 into to space 44 will force piston-pushrod 34 upward with diaphragm 42, causing the top surface 70 of bolt 68 to contact seating surface 50 surrounding orifice 52, blocking the ingress of high pressure gas into chamber 40 and the communicating vehicle fuel system. In FIG. 2, sealing diaphragm 42 and diaphragm retaining plate 64 may be replaced with an O-ring contacting the inner wall of amp 32 positioned within an annular groove machined into the side of crown 35 (not shown), in order to seal hydraulic servo pressure within chamber 40. Bolt 68 or a convex valve head means formed at the apex of crown 35 may block orifice 52 in the event that a high pressure gas leak from regulator 10 forces structure 34 upward against orifice 52.

Alternate "Two Stage" Embodiment

Referring generally to FIGS. 3-3b, wherein like numerals represent like parts, there is depicted a two-stage embodiment, in accordance with the present invention. In order to counteract erratic low servo fluid pressure during engine idle that may result from fluctuating low pressure engine driven fluid sources or voltage driven sources subject to intermittent loads, a "two stage" embodiment of the present invention seen vertically disposed in the FIG. 3 cross section may be employed utilizing load spring 180 positioned between regulator sensing piston 16 and piston-pushrod 134. Referencing FIG. 3a, initially low servo pressure within hydraulic amp pressure chamber 40 is applied to collar 182 and added to that of piston crown 135 through flange 184 located around the lower circumference of crown 135. Piston-pushrod 134 and collar 182 initially move down together compressing load spring 180 against regulator piston 16 until piston-pushrod travel is limited when collar 182 contacts amp housing base 186. This initial operational "first stage" puts spring 180 in the spring's 180 active pressure range against regulator piston 16. No further movement of collar 182 is possible once the collar 182 bottoms on amp housing base 186. First stage regulator output is thus determined solely by load spring 180. Piston-pushrod crown 135, is sealed against the inner circumference of surrounding collar 182 by O-ring 88 located within a groove around the inner circumference of collar 182, and O-ring 90 located within a groove within the flange 184 of piston-pushrod 134.

Referencing FIG. 3b, "Stage two" increasing engine fuel demand causes rising servo pressure within chamber 40, amplified solely by smaller diameter piston-pushrod crown 135 within the now stationary collar 182, to overcome the 50 lb. counterforce of spring 180. Piston-pushrod 134 may then continue moving downward alone within the now stationary collar 182, exerting greater force against the load spring 180 thus causing a proportional rise in gas regulator output pressure up to and beyond the 89 lb. limit of the load spring's 180 pressure range limit in concert with engine fuel demand.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A variable pressure gaseous fuel supply system for an engine capable of burning liquid and gaseous fuels individually or simultaneously comprising:
    (a) a source of fuels such as natural gas and hydrogen pressurized to approximately 200 psi or higher piped to;
    (b) a variable gaseous fuel pressure regulator incorporating;
    (c) an attached hydraulically amplifying servo actuator henceforth referred to as a hydraulic amp which contains a hydraulic pressure sensing chamber variably pressurized through an orifice in said hydraulic amp communicating with;
    (d) a variable pressure hydraulic servo pressure circuit wherein;
    (e) pressurized hydraulic servo fluid is isolated from yet mechanically communicable with the load governing side of the gaseous fuel pressure regulator's internal pressure sensing element and connected flow control valve by a piston-pushrod structure contained within said attached hydraulic amp, said piston-pushrod having at one end a relatively large pressure sensing piston crown communicating with said hydraulic pressure sensing chamber, and at the opposite end a relatively smaller surface that abuts and transmits variable hydraulic servo pressure to said gaseous fuel pressure regulator's internal pressure sensing element and connected flow control valve, whereby said larger diameter piston crown of said piston-pushrod amplifies the pressure of the hydraulic servo fluid against the abutting smaller diameter regulator sensing element, thereby producing a proportionately a higher, variable pressure fuel flow from the gaseous pressure regulator.

2. The variable pressure gaseous fuel supply system of claim 1 wherein pressurized hydraulic fluid for said variable hydraulic servo pressure circuit emanates from a communicating liquid supply.

3. The variable pressure gaseous fuel supply system of claim 1 wherein a flexible diaphragm is positioned between said hydraulic pressure sensing chamber and said pressure sensing piston crown of said piston-pushrod within said hydraulic amp, whereby said diaphragm abuts and transmits pressure to said piston crown while sealing hydraulic servo fluid within said hydraulic pressure sensing chamber.

4. The variable pressure gaseous fuel supply system of claim 1 wherein said piston-pushrod is comprised of aluminum, or of a suitably reinforced plastic or carbon composite material.

5. The variable pressure gaseous fuel supply system of claim 1 wherein the output pressure of the gaseous regulator is multiplied by a factor approximating the ratio of the diameter of the larger area of said piston crown of said piston-pushrod to the diameter of the smaller area of the gaseous regulator's abutting pressure sensing element.

6. The variable pressure gaseous fuel supply system of claim 3 whereby said flexible diaphragm acts to block off and seal one or more orifices in said sensing chamber of said amp communicating with said hydraulic servo pressure circuit, in the event gas leaking from the attached gaseous fuel pressure regulator acts to push said piston pushrod and said diaphragm up against said orifices.

7. The variable pressure gaseous fuel supply system of claim 1 wherein said variable hydraulic servo pressure circuit comprises a liquid fuel supply system for either a bi-fuel engine application where liquid fuel is utilized alternately with a gaseous fuel, or a duel fuel engine application where liquid fuel is combusted simultaneously with a gaseous fuel.

8. The variable pressure gaseous fuel supply system of claim 7 wherein the hydraulic fluid within said variable hydraulic servo pressure circuit is comprised of alcohol or an alcohol solution to be selectively injected simultaneously with a gaseous fuel for the purpose of reducing uncontrolled combustion or engine knock, especially in supercharged engines.

9. The variable pressure gaseous fuel supply system of claim 7 wherein variable pressure for said variable hydraulic servo pressure circuit and resultant variable gaseous regulator pressure output is controlled by one or more of the following hydraulic flow control components: an electric or engine driven variable flow fuel pump; an electric or mechanically adjustable variable flow valve, and a liquid fuel pressure regulator.

10. The variable pressure gaseous fuel supply system of claim 9 wherein the variable flow fuel pump, the variable flow valve and the liquid fuel pressure regulator are each singularly or in combination controlled by an engine control unit (ECU) responsive to one or more sensed fuel demand parameters such as speed, intake air mass flow and intake manifold air pressure.

11. The variable pressure gaseous fuel supply system of claim 9 whereby the hydraulic servo pressure circuit flow control components control power output by modulating servo pressure, and resulting gaseous regulator output and fuel rail pressure, wherein optimum air-fuel ratios are obtained by an air inlet throttle valve that regulates inlet air flow in response to gaseous fuel rail pressure.

12. The variable pressure gaseous fuel supply system of claim 9 wherein the hydraulic servo pressure circuit flow controlling functions of said electric or engine driven variable flow fuel pump, said electric or mechanically adjustable variable flow valve and said liquid fuel pressure regulator are supplanted by an electromagnetically actuated, ECU controlled variable pressure liquid fuel pressure regulator of sufficient dynamic pressure range capable of producing the required variable hydraulic servo pressure for variable rail pressure gaseous engine operation, as well as the required pressure for liquid fuel operation.

13. The variable pressure gaseous fuel supply system of claim 12 wherein said electromagnetically actuated liquid fuel pressure regulator contains a flow control valve actuated by an attached armature reciprocating within a magnetic field generated by a surrounding coil.

14. The variable pressure gaseous fuel supply system of claim 1 wherein a convex bolt head attached to the apex of said piston crown of said piston pushrod is closeable on said orifice communicating between said hydraulic servo pressure circuit and said hydraulic pressure sensing chamber, whereby said bolt head acts to block off and seal said orifice in the event gas leaking from said attached gaseous fuel pressure regulator forces said piston pushrod and said bolt head up against said orifice.

15. The variable pressure gaseous fuel supply system of claim 1 wherein two stage operation is provided through a moveable pressure sensing collar that selectively increases the pressure amplifying surface area of said piston crown of said piston-pushrod during initial application of low servo fluid pressure in order to cause a downward movement of said piston pushrod, limited by contact of said collar with the lower internal surface of said hydraulic amp, against a load spring that contacts a regulator pressure sensing element thereby producing a static low pressure output of said gaseous pressure regulator governed solely by said load spring during the first stage operation of said regulator.

16. The variable pressure gaseous fuel supply system of claim 15 wherein higher pressure output from a second stage operation of said gaseous pressure regulator begins when pressure within said hydraulic amp rises beyond that of said low servo fluid pressure of said first stage operation as rising pressure amplified solely by said piston crown, independent of said travel limited collar, causes said piston-pushrod to continue downward movement within said collar, now stationary, to overcome the first stage counter force of said load spring in order to increase amplified servo pressure acting through said load spring upon said regulator pressure sensing element resulting in increasing regulator pressure output.

17. The variable pressure gaseous fuel supply system of claim 15, whereby the specific static load spring governed first stage regulator output pressure ends and dynamic servo pressure controlled regulator pressure output begins may be determined by the difference between the pressure amplifying surface areas of said collar and said piston crown.

18. The variable pressure gaseous fuel supply system of claim 16, whereby the specific static load spring governed first stage regulator output pressure ends and dynamic servo pressure controlled regulator pressure output begins may be determined by the difference between the pressure amplifying surface areas of said collar and said piston crown.

19. A variable pressure gaseous fuel supply system for an engine capable of burning liquid and gaseous fuels individually or simultaneously comprising:
(a) a source of fuels such as natural gas and hydrogen pressurized to approximately 200 psi or higher piped to;
(b) a variable gaseous fuel pressure regulator incorporating;
(c) an attached hydraulically amplifying servo actuator henceforth referred to as a hydraulic amp which contains a hydraulic pressure sensing chamber variably pressurized through an orifice in said hydraulic amp communicating with;
(d) a variable pressure hydraulic servo pressure circuit wherein;
(e) pressurized hydraulic servo fluid is isolated from yet mechanically communicable with the load governing side of the gaseous fuel pressure regulator's internal pressure sensing element and connected flow control valve by a piston-pushrod structure contained within said attached hydraulic amp, said piston-pushrod having at one end a relatively large pressure sensing piston crown communicating with said hydraulic pressure sensing chamber, and at the opposite end a relatively smaller surface that abuts and transmits variable hydraulic servo pressure to said gaseous fuel pressure regulator's internal pressure sensing element and connected flow control valve, whereby said larger diameter piston crown of said piston-pushrod amplifies the pressure of the hydraulic servo fluid against the abutting smaller diameter regulator sensing element, thereby producing a proportionately a higher, variable pressure fuel flow from the gaseous pressure regulator; and
(f) two stage operation provided through a moveable pressure sensing collar that selectively increases the pressure amplifying surface area of said piston crown of said piston-pushrod.

20. The variable pressure gaseous fuel supply system of claim 19, wherein the moveable pressure sensing collar selectively increases the pressure amplifying surface area of said piston crown of said piston-pushrod during initial application of low servo fluid pressure in order to cause a downward movement of said piston pushrod, limited by contact of said collar with the lower internal surface of said hydraulic amp, against a load spring that contacts a regulator pressure sensing element thereby producing a static low pressure output of said gaseous pressure regulator governed solely by said load spring during a first stage operation of said regulator, wherein higher pressure output from a second stage operation of said gaseous pressure regulator begins when pressure within said hydraulic amp rises beyond that of said low servo fluid pressure of said first stage operation as rising pressure amplified solely by said piston crown, independent of said travel limited collar, causes said piston-pushrod to continue downward movement within said collar, which is now stationary, to overcome the first stage counter force of said load spring in order to increase amplified servo pressure acting through said load spring upon said regulator pressure sensing element resulting in increasing regulator pressure output.

* * * * *